United States Patent
Erlich et al.

(10) Patent No.: US 7,411,898 B2
(45) Date of Patent: Aug. 12, 2008

(54) PREAMBLE GENERATOR FOR A MULTIBAND OFDM TRANSCEIVER

(75) Inventors: Yossi Erlich, Hod Hasharon (IL); Assaf Gurevitz, Tel Aviv (IL); Eyal Hochdorf, Haifa (IL)

(73) Assignee: Infineon Technologies AG, Munich (DE)

( * ) Notice: Subject to any disclaimer, the term of this patent is extended or adjusted under 35 U.S.C. 154(b) by 657 days.

(21) Appl. No.: 10/956,356

(22) Filed: Sep. 30, 2004

(65) Prior Publication Data

US 2005/0265220 A1 Dec. 1, 2005

Related U.S. Application Data

(60) Provisional application No. 60/574,496, filed on May 26, 2004, provisional application No. 60/572,153, filed on May 18, 2004, provisional application No. 60/569,780, filed on May 10, 2004.

(51) Int. Cl.
*H04J 11/00* (2006.01)
(52) U.S. Cl. ........................ 370/208; 375/260
(58) Field of Classification Search ............... 370/203, 370/208, 209, 320, 342; 375/365, 367, 260
See application file for complete search history.

(56) References Cited

U.S. PATENT DOCUMENTS

| | | | | |
|---|---|---|---|---|
| 7,248,659 | B2 * | 7/2007 | Roberts | 375/355 |
| 7,257,151 | B2 * | 8/2007 | Batra et al. | 375/147 |
| 2005/0232342 | A1 * | 10/2005 | Batra et al. | 375/148 |
| 2006/0182063 | A1 * | 8/2006 | Ma et al. | 370/331 |

* cited by examiner

*Primary Examiner*—Ricky Ngo
*Assistant Examiner*—Pao Sinkantarakorn
(74) *Attorney, Agent, or Firm*—Maginot, Moore & Beck

(57) ABSTRACT

Preamble generator for a multiband frequency division multplexing (OFDM) tranceiver of a wireless personal area network (WPAN) being switchable between a time frequency interleaving (TFI)-mode wherein data packets are transmitted by said transceiver in different frequency bands according to a predetermined frequency hopping pattern and a fixed frequency interleaving (FFI) mode wherein data packets are transmitted by the transceiver in at least one fixed frequency band, wherein said preamble generator scrambles in the fixed frequency interleaving (FFI) mode a predetermined preamble of the data packets by multiplying said preamble with a pseudo random data sequence to flatten a power spectrum of said preamble.

16 Claims, 12 Drawing Sheets

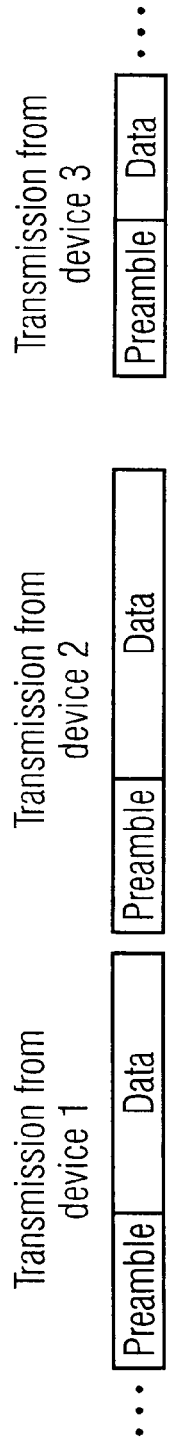
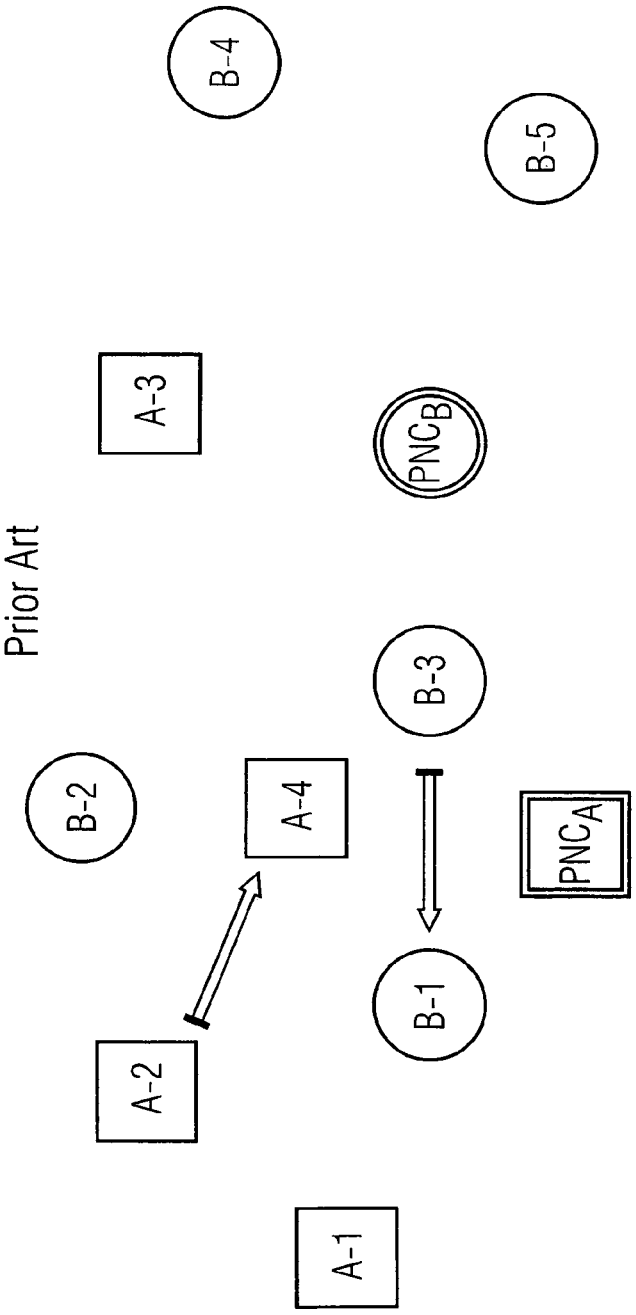
FIG 1
Prior Art
FIG 2
Prior Art

FIG 15

Table 10 - Cover sequences for time domain preamble (a) Standard Preamble

| Sample index | Sequence index | | |
|---|---|---|---|
| | 1(TFCs 1,2) | 2(TFCs 3,4) | 3(TFCs 5,6,7) |
| 0 | 1 | 1 | -1 |
| 1 | 1 | 1 | -1 |
| 2 | 1 | 1 | -1 |
| 3 | 1 | 1 | -1 |
| 4 | 1 | 1 | -1 |
| 5 | 1 | 1 | -1 |
| 6 | 1 | 1 | -1 |
| 7 | 1 | 1 | 1 |
| 8 | 1 | 1 | -1 |
| 9 | 1 | 1 | -1 |
| 10 | 1 | 1 | 1 |
| 11 | 1 | 1 | -1 |
| 12 | 1 | 1 | -1 |
| 13 | 1 | 1 | 1 |
| 14 | 1 | 1 | -1 |
| 15 | 1 | 1 | -1 |
| 16 | 1 | 1 | 1 |
| 17 | 1 | 1 | -1 |
| 18 | 1 | 1 | -1 |
| 19 | 1 | -1 | 1 |
| 20 | 1 | 1 | -1 |
| 21 | -1 | -1 | 1 |
| 22 | -1 | 1 | 1 |
| 23 | -1 | -1 | 1 |

FIG 16

(b) Shortened Preamble

| Sample index | Sequence index | | |
|---|---|---|---|
| | 1(TFCs 1,2) | 2(TFCs 3,4) | 3(TFCs 5,6,7) |
| 0 | 1 | 1 | -1 |
| 1 | 1 | 1 | -1 |
| 2 | 1 | 1 | -1 |
| 3 | 1 | 1 | 1 |
| 4 | 1 | 1 | 1 |
| 5 | 1 | 1 | -1 |
| 6 | 1 | 1 | -1 |
| 7 | 1 | -1 | 1 |
| 8 | 1 | 1 | -1 |
| 9 | -1 | -1 | 1 |
| 10 | -1 | 1 | 1 |
| 11 | -1 | -1 | 1 |

FIG 17

Table 9 – Time-domain packet synchronization sequence for Preamble Pattern 5

| Sequence Element | Value | Sequence Element | Value | Sequence Element | Value | Sequence Element | Value |
|---|---|---|---|---|---|---|---|
| $c_0$ | 0.9574 | $c_{32}$ | 0.8400 | $c_{64}$ | 0.5859 | $c_{96}$ | -0.8528 |
| $c_1$ | 0.5270 | $c_{33}$ | 1.3980 | $c_{65}$ | 0.3053 | $c_{97}$ | -0.6973 |
| $c_2$ | 1.5929 | $c_{34}$ | 1.1147 | $c_{66}$ | 0.8948 | $c_{98}$ | -1.2477 |
| $c_3$ | -0.2500 | $c_{35}$ | -0.4732 | $c_{67}$ | -0.6744 | $c_{99}$ | 0.6246 |
| $c_4$ | -0.2536 | $c_{36}$ | -1.7176 | $c_{68}$ | -0.8901 | $c_{100}$ | 0.7687 |
| $c_5$ | -0.3023 | $c_{37}$ | -0.8477 | $c_{69}$ | -0.8133 | $c_{101}$ | 0.7966 |
| $c_6$ | 1.2907 | $c_{38}$ | 1.5083 | $c_{70}$ | 0.9201 | $c_{102}$ | -1.2809 |
| $c_7$ | -0.4258 | $c_{39}$ | -1.4364 | $c_{71}$ | -1.0841 | $c_{103}$ | 1.1023 |
| $c_8$ | 1.0012 | $c_{40}$ | 0.3853 | $c_{72}$ | -0.8036 | $c_{104}$ | 0.4250 |
| $c_9$ | 1.7704 | $c_{41}$ | 1.5673 | $c_{73}$ | -0.3105 | $c_{105}$ | -0.1614 |
| $c_{10}$ | 0.8593 | $c_{42}$ | 0.0295 | $c_{74}$ | -1.0514 | $c_{106}$ | 0.7547 |
| $c_{11}$ | -0.3719 | $c_{43}$ | -0.4204 | $c_{75}$ | 0.7644 | $c_{107}$ | -0.6696 |
| $c_{12}$ | -1.3465 | $c_{44}$ | -1.4856 | $c_{76}$ | 0.7301 | $c_{108}$ | -0.3920 |
| $c_{13}$ | -0.7419 | $c_{45}$ | -0.8404 | $c_{77}$ | 0.9788 | $c_{109}$ | -0.7589 |
| $c_{14}$ | 1.5350 | $c_{46}$ | 1.0111 | $c_{78}$ | -1.1305 | $c_{110}$ | 0.6701 |
| $c_{15}$ | -1.2800 | $c_{47}$ | -1.4269 | $c_{79}$ | 1.3257 | $c_{111}$ | -0.9381 |
| $c_{16}$ | 0.6955 | $c_{48}$ | 0.3033 | $c_{80}$ | 0.7801 | $c_{112}$ | -0.7483 |
| $c_{17}$ | 1.7204 | $c_{49}$ | 0.7757 | $c_{81}$ | 0.7867 | $c_{113}$ | -0.9659 |
| $c_{18}$ | 0.1643 | $c_{50}$ | -0.1370 | $c_{82}$ | 1.0996 | $c_{114}$ | -0.9192 |
| $c_{19}$ | -0.3347 | $c_{51}$ | -0.5250 | $c_{83}$ | -0.5623 | $c_{115}$ | 0.3925 |
| $c_{20}$ | -1.7244 | $c_{52}$ | -1.1589 | $c_{84}$ | -1.2227 | $c_{116}$ | 1.2864 |
| $c_{21}$ | -0.7447 | $c_{53}$ | -0.8324 | $c_{85}$ | -0.8223 | $c_{117}$ | 0.6784 |
| $c_{22}$ | 1.1141 | $c_{54}$ | 0.6336 | $c_{86}$ | 1.2074 | $c_{118}$ | -1.0909 |
| $c_{23}$ | -1.3541 | $c_{55}$ | -1.2698 | $c_{87}$ | -1.2338 | $c_{119}$ | 1.1140 |
| $c_{24}$ | -0.7293 | $c_{56}$ | -0.7853 | $c_{88}$ | 0.2957 | $c_{120}$ | -0.6134 |
| $c_{25}$ | 0.2682 | $c_{57}$ | -0.7031 | $c_{89}$ | 1.0999 | $c_{121}$ | -1.5467 |
| $c_{26}$ | -1.2401 | $c_{58}$ | -1.1106 | $c_{90}$ | -0.0201 | $c_{122}$ | -0.3031 |
| $c_{27}$ | 1.0527 | $c_{59}$ | 0.6071 | $c_{91}$ | -0.5860 | $c_{123}$ | 0.9457 |
| $c_{28}$ | 0.1199 | $c_{60}$ | 0.7164 | $c_{92}$ | -1.2284 | $c_{124}$ | 1.9645 |
| $c_{29}$ | 1.1496 | $c_{61}$ | 0.8305 | $c_{93}$ | -0.9215 | $c_{125}$ | 1.4549 |
| $c_{30}$ | -0.0544 | $c_{62}$ | -1.2355 | $c_{94}$ | 0.7941 | $c_{126}$ | -1.2760 |
| $c_{31}$ | 1.3176 | $c_{63}$ | 1.1754 | $c_{95}$ | -1.4128 | $c_{127}$ | 2.2102 |

PREAMBLE GENERATOR FOR A MULTIBAND OFDM TRANSCEIVER

CROSS-REFERENCE TO RELATED APPLICATIONS

This application claims the benefit of U.S. provisional application No. 60/569,780, filed May 10, 2004, U.S. provisional application No. 60/572,153, filed May 18, 2004 and U.S. provisional application No. 60/574,496, filed May 26, 2004.

FIELD OF THE INVENTION

The present invention relates generally to a transceiver for a wireless local area network (WLAN) which is operated simultaneously with other wireless local area networks (WLANs) in the same local area and in particular to a preamble generator and to a preamble detector of said transceiver.

BACKGROUND

FIG. 1 shows the transmission of data in a wireless system according to the state of the art. Several transceivers belonging to the same wireless local area network (WLAN) use the same data transmission channel by means of time sharing. At any specific time only one transceiver is transmitting. Accordingly the transmissions from each transceiver are burst like. For helping the receiving transceiver to identify a data transmission burst and for extracting the delivered information data the transmitting transceiver sends a predefined preamble signal preceding the data portion of the data transmission burst. The transceiver that receives the data transmission burst comprises a preamble detection unit that identifies the preamble and thus identifies the data transmission burst. The transceiver uses further the preamble for estimating data transmission and channel parameters such as channel response and carrier and timing offsets that are needed for the data information extraction.

Commonly several communication networks share the same data transmission media. Specifically collocated wireless networks utilize the same frequency spectrum.

FIG. 2 shows two collocated wireless networks according to the state of the art.

Wireless local areas networks (WLAN) represent a new form of communications among personal computers or other devices that wish to deliver digital data. A wireless network is one that does not rely on cable as the communications medium. Whether twisted pair, coax, or optical fibres, hard wiring for data communication systems within a building environment is expensive and troublesome to install, maintain and to change. To avoid these disadvantages wireless networks transmit data over the air using signals that cover a broad frequency range from few MHz to a few terahertz. Depending on the frequency involved wireless networks comprise radio wireless networks, microwave wireless networks and infrared wireless networks.

Wireless networks are used mainly for connecting devices within a building or connecting portable or mobile devices to a network. Further applications are keeping mobile devices in contact with a data base and ad hoc networks for example in committee or business meetings.

Wireless local area networks (WLAN) and wireless personal area networks (WPAN) are used to convey information over relatively short ranges. A wireless personal area network (WPAN) is defined in the IEEE 802.15.3 standard.

In many situations and scenarios several wireless local area networks (WLANs) are operated simultaneously with each other in the same local area. A typical situation would be a big office wherein many office cubicles are located belonging to different divisions of the same company, e.g. search division, accounting division, marketing division. The computers of each division are connected in such a situation by means of separate wireless local area networks (WLANs). A wireless local area network (WLAN) comprising several transceivers is referred to as a Piconet.

FIG. 2 shows typical scenario where two wireless local area networks (WLANS) are operated in the same local area.

In the shown example a first transmitting transceiver A2 transmits data to a receiving transceiver A4 of the first wireless local area network $WLAN_A$ on the data transmission channel of the wireless local area network $WLAN_A$. Further a transmitting transceiver B3 of the second wireless local area network $WLAN_B$ transmits data to a receiving transceiver B1 of the same wireless local network $WLAN_B$ on the data transmission channel of this wireless local area network. The data exchange between transceivers is performed half duplex, i.e. a transceiver can either send or receive data over a data link to another transceiver of the same wireless local area network. The data are exchanged via data packets.

Each Piconet $WLAN_i$ has its respective data transmission channel, i.e. the data transmission channel is used by all transceivers of the corresponding Piconet $WLAN_i$.

In most cases the frequency resources available for a wireless local area network WLAN are bounded by regulations. Usually a certain frequency band is allocated for the wireless local networks. Within this frequency band each transceiver is required to radiate no more than a specified average power spectral density (PSD).

To operate several wireless local area networks simultaneously several proposals have been made.

In frequency division multiplexing (FDM) systems according to the state of the art the allocated frequency band is divided into several sub-frequency bands. In FDM-system each data transmission channel and consequently each Piconet is using a different frequency sub-band. Thus, data transmission in different Piconets (WLANs) can simultaneously be performed without interference.

The disadvantage of FDM-systems is that the available capacity for each Piconet is reduced compared to the case where any Piconet is allowed to use the entire allocated frequency band.

The channel capacity is given by the following formula:

$$cap = \int \log\left(1 + \frac{PSD(f)}{N(f)}\right) df$$

The capacity of each Piconet is larger if it will be allowed to use the full frequency band instead of just the allocated frequency sub-band. The reduction in the capacity in FDM-systems translates directly to throughput reduction Consequently the achievable data bit rate for any specific transmitter-receiver distance is reduced in FDM-systems.

In a CDMA-DSSS (Code Division Multiple Access—Direct Sequence Spread Spectrum) system according to the state of the art a direct sequence spread spectrum is used as a modulation scheme. In DSSS a sequence of many short data symbols is transmitted for each information symbol. In order to support several data transmission channels or Piconets different data sequences with low cross correlation between them are used for different data transmission channels.

In a CDMA-DSSS-system each channel can use the entire frequency band until the maximum possible throughput can be achieved. If some Piconets are working in the same area then the transmission of one Piconet is seen as additional noise by the other Piconets.

The disadvantage of the CDMA-DSSS-System is that there exists a so (called near-far problem. When a transceiver in one Piconet is transmitting this transmission will be seen as additional noise by other Piconets. The level of the additional noise is proportional to the cross correlation between the spreading sequences and the received power level of the interferer's signal. For example if the interfering transceiver of Piconet A is close to a receiving transceiver of Piconet B, i.e. closer than a transmitting receiver of Piconet B then the added noise level that the receiving transceiver of Piconet B sees causes a significant reduction in the achievable bit rate for the receiver, so that even a complete blocking of the data transmission channel can occur.

A further proposal according to the state of the art to operate several wireless local area networks (WLANs) simultaneously is to use a CDMA-FH(Code Division Multiple Access—Frequency Hopping)—System. In this CDMA-FH-System the original frequency band is divided into several sub-frequency bands. Any transmitting transceiver uses a certain frequency sub-band for a certain time interval and moves then to the next frequency band. A predefined frequency hopping sequence controls the order of sub-frequency bands such that both the transmitting and receiving transceiver has the information when to switch to the next frequency and to what sub-frequency band.

In a conventional CDMA-FH-System the different data transmission channels are assigned with different frequency hopping sequences.

FIG. 3 shows a CDMA-FH-System according to the state of the art with data transmission channels A CDMA-FH-System with four data transmission channels can operate four Piconets or wireless local area networks (WLANs) simultaneously at the same local area. In the shown example any transceiver uses a certain frequency band for a transmission interval for 242 ns, remains idle for a predetermined guard time of 70 ns and uses the next frequency band within the next transmission interval etc.

The frequency hopping sequence is fixed for any data transmission channel A, B, C, D. In the given example data transmission channel A has the frequency hopping sequence abc, channel B has the frequency hopping sequence acb, channel C has the frequency hopping sequence aabbcc and channel D has the frequency hopping sequence aaccbb.

A collision is a situation when two transceivers use the same frequency band at the same time. For example a collision between data transmission channel A and data transmission channel B occurs during the first transmission interval when both channels A, B use frequency fa and during the fourth transmission interval when both channels A, B use again frequency fa. A further collision is for example between channel B ant channel D during the first transmission interval when both channels B, D use frequency a and the sixth transmission interval when both channels B, D use frequency fb.

When the frequency hopping order of two wireless networks differs two transceivers that belong to different wireless local area networks can transmit at the same time. It may happen that both transceivers use the same carrier frequency at the same time.

FIG. 4 illustrates simultaneous data transmission from transceivers in two different networks WLAN A, WLAN B at the same time. Each data transmission burst comprises a preamble signal and a data signal. The data signal includes header data and payload data.

The preamble detector in a transceiver that intends to decode bursts in network A needs to discriminate preambles for network B. Further the receiving transceiver is able to detect and estimate relevant parameters from a legitimate preamble in the potential simultaneous presence of other transmissions.

One possible CDMA-FH solution is based on OFDM and is called Multiband OFDM. In this case the transceiver transmits a single OFDM in one band and then hops to the next band for transmitting the next OFDM symbol. FIG. 3A depicts 6 OFDM symbols for each channel.

As shown in FIG. 3A the Multiband OFDM Transceiver performs in a time frequency interleaving (TFI) mode band-hopping wherein in each frequency band an OFDM symbol is transmitted. The band-hopping sequence is defined by a TFC code (Time frequency code) stored in a memory. Different collocated networks use different TFC codes. This enables simultaneous transmission of different networks. OFDM symbols from collocated networks collide. In common scenarios the collision level enables efficient communication. Yet in some cases the collisions situation is severe and the communication is not efficient. To overcome severe collisions between transmission of different networks frequency domain separation (known as FDM) between the wireless networks can be implemented. This is achieved by adding TFC codes with constant band usage (fixed frequency bands). Accordingly a Multiband OFDM Transceiver according to the state of the art is switchable between a time frequency interleaving mode (TFI mode) and a fixed frequency interleaving mode (FFI mode). FIG. 3B shows 7 channels (7 TFC) where 4 channels are of TFI type and 3 channels are of FFI type.

As can be seen in FIG. 3 the transceiver occupies in the TFI mode three frequency bands, wherein each frequency band has a predetermined frequency bandwidth. In an evolving multi-band OFDM standard which defines the physical layer of an ultra wideband based wireless personal access network the tranceiver transmits in both modes, i.e. in the TFI mode and in the FFI mode the same preamble as shown in FIG. 5. FIG. 5 shows a so called long preamble having N=24+6 OFDM symbols. The preamble according to the state of the art as shows in FIG. 5 is subdivided-into two sections. The first preamble section (24 OFDM symbols) is typically used for packet detection/acquisition, coarse frequency estimation, gain control, synchronization, timing and offset estimation, The first section of the conventional preamble as shown in FIG. 5 comprises 24 OFDM symbols, wherein the first twenty-one OFDM symbols are identical and the last three OFDM symbols are inverted. These three OFDM symbols are used for synchronization within a data packet. The second preamble section is typically used for channel estimation, wherein the channel estimation sequence comprises six OFDM symbols. According to the evolving multiband OFDM standard the period of one OFDM symbol is 312.5 nSec, i.e. a data length of 242.5 nsec (128 samples at 528 Msps) and a silence time of 70 nSec (37 samples at 528 Msps) between two transmissions. Consequently the OFDM symbol rate $R_s$=3.2 MHz=1/312.5 nSec. When using three frequency bands there are seven possible time frequency codes (TFC). The first four TFC codes define the frequency band hopping sequence when the transceiver is in the TFI mode. When the transceiver is switched to the FFI mode the transceiver transmits the signal in a fixed frequency band. As shown in the following table and in FIG. 3A, the fifth TFC code indicates that transceiver transmits a signal in a first frequency band, the sixth TFC code indicates that the transceiver transmits the signal in a second frequency band and the seventh TFC code indicates that the transceiver transmits a signal in a third frequency band.

The following TFC code have three frequency bands as summarized in the following table:

TABLE 1

| TFC Index | Code | Type |
| --- | --- | --- |
| 1 | [1, 2, 3] | TFI |
| 2 | [1, 3, 2] | TFI |
| 3 | [1, 1, 2, 2, 3, 3] | TFI |
| 4 | [1, 1, 3, 3, 2, 2] | TFI |
| 5 | [1] | FFI |
| 6 | [2] | FFI |
| 7 | [3] | FFI |

The multiband frequency division multiplexing transceiver according to the prior art uses two types of preambles. The first type of the first section of the preamble as shown in FIG. 5 includes N=24 OFDM symbols and is called a long preamble. The second preamble is called a short preamble and comprises N=12 OFDM symbols in the first preamble section.

The short preamble is used when a sequence of packets is transmitted by the same transmitter in scenarios where the detection is relatively easy to perform, i.e. when a good signal to noise ratio is given and the inter-packet guard time is known.

Within the first section of the preamble, which includes N OFDM symbol, each OFDM symbol is typically not a frequency domain signal. The symbol is a time domain signal which is defined by a time domain sequence. Nevertheless these symbols maintain the same duration and power as the OFDM symbols and are referred in this document as OFDM symbols.

In the conventional OFDM transceivers for wireless networks the preambles are identical both in the FEI mode and in the TFI mode. The beginning of the preamble is shown in FIG. 5, i.e. wherein the first N-K symbols are used for preamble detection by the receiving transceiver. The section of the K=3 preamble OFDM symbols which is also called a delimiter is provided for the identification of the end of the first section of the preamble. The OFDM symbols of the frame synchronization sequence as shown in FIG. 5 are inverted with respect to the OFDM symbols of the first 21 OFDM symbols. An OFDM symbol inversion enables an identification of the delimiter at the receiving side by watching a single frequency band out of the three frequency bands.

However the OFDM transceiver according to the state of the art using the same preamble sequence in the TFI mode and in the FFI mode has two major disadvantages. Since the period of one OFDM symbol within the packet synchronization sequence as shown in FIG. 5 having 21 OFDM symbols is 312.5 nSec there is a ripple in the frequency domain with frequency peaks every 3.2 MHz. The rippled power spectrum of the preamble affects the overall measured transmission frequency spectrum that includes the preamble and the data. The effect of the rippled preamble spectrum is in particular severe in the FFI mode of the transceiver because the preamble signal includes a long section of repeated OFDM symbols in the same frequency band at a periodicity rate RS=3.2 MHz. For maximizing the transceiver performance the maximum allowed transmitted power is used. Regulation bodies such as the Federal Communication Commission (FCC) in the USA limit the PSD in a resolution band width $R_{PSD}$=1 MHz. This means that within any 1 Mz band the power is limited. Since the PSD of the state of the art FFI node has ripple, the transceiver reduces the overall transmitted power, compared to a scenario where the PSD is flat, such that the spectral peaks do not exceed the allowed level set by the laws. The PSD defined by the FCC for ultra-wideband and communication is for instance −41.3 dBm/MHz. Actually the reduced transmission power of the transceiver results in a reduced signal to noise ratio (SNR) at the receiving transceiver so that the performance of the data transmission is degraded. The necessary transmission power reduction results in a reduced data rate, reduced supported range and an increased bit error rate BER.

A further draw back for conventional transceiver according to the state of the art using the same preamble in the TFI mode and in the FFI mode is that the detection of the delimiter in the FFI mode is uncertain. The delimiter shown in FIG. 5 comprises 3 OFDM symbols, i.e. an OFDM symbol for each frequency band used in the TFI mode for frequency hopping. The detection of the delimiter is essential for the next stages of the packet reception. This is done by detecting the last K=3 OFDM symbols in the first section of the preamble. In the TFI mode a single inverted OFDM symbol within the delimiter uniquely identifies the timing of the delimiter. However in the FFI mode a fixed frequency is used and a lost symbol at the receiving transceiver e.g. caused by a colliding symbol, may cause uncertainty in the delimiter timing of the receiving transceiver. For example if the OFDM symbol N−2 is badly received the delimiter detector in the receiving transceiver might mistakenly assume that the OFDM symbol N−1 is symbol N−2 and accordingly output a wrong decision. Under a scenario of simultaneously operating networks this situation might cause a packet loss since some of the symbols may be collided and wrongly detected.

Accordingly it is the object of the present invention to provide a preamble generator for a multiband orthogonal frequency division multiplexing transceiver which overcomes the above mentioned drawbacks and in particular to provide a preamble generator wherein the preamble spectrum in an FFI mode is more flat.

SUMMARY

The invention provides the preamble generator for a multiband orthogonal frequency division multiplexing OFDM transceiver of a wireless personal area network WPAN being switchable between a time frequency interleaving (TFI) mode wherein data packets are transmitted by the transceiver in different frequency bands according to a predefined hopping pattern and a fixed interleaving (FFI) mode wherein data packets are transmitted by the transceiver in a fixed frequency band, wherein the preamble generator scrambles in the fixed frequency interleaving (FFI) mode a predetermined preamble of data packets by multiplying that preamble with a pseudo random data sequence to flatten the power spectrum of said preamble.

In a preferred embodiment of the pseudo random data sequence is binary.

In a preferred embodiment of the preamble generator according to the present invention, the preamble comprises a predetermined number N of OFDM symbols.

In a preferred embodiment of the preamble generator according to the present invention the preamble generator comprises a memory for storing at least one preamble, a memory for storing at least one pseudo random data sequence, and a calculating unit for scrambling said preamble with said pseudo random data sequence when a control signal indicates that the transceiver is in the FFI—mode.

In a preferred embodiment of the preamble generator according to the present invention the binary pseudo random data sequence comprises a predetermined number of binary data values, wherein the number of binary data values corresponds to the number of N OFDM symbols within that preamble.

In a preferred embodiment of the preamble generator each OFDM symbol of said preamble consists of a sequence of data samples.

In a preferred embodiment each OFDM symbol consists of 128 data samples.

In a preferred embodiment of the preamble generator according to the present invention in the memory of the preamble generator a long preamble is stored which comprises 24 OFDM symbols and a short preamble is stored which comprises 12 OFDM symbols.

In a preferred embodiment of the preamble generator according to the present invention in the memory of the preamble generator a long pseudo random sequence ($X_{LONG}$) is stored which comprises 24 binary data values and a short pseudo random sequence ($X_{SHORT}$) is stored which comprises 12 binary data values.

In a preferred embodiment of the preamble generator according to the present invention the long pseudo random sequence ($X_{LONG}$) is $$X_{LONG}=(-1,-1,-1,-1,-1,-1,-1,1,-1,-1,1,-1,\\ -1,1,-1,-1,1,-1,-1,1,-1,1,1,1)$$

In a preferred embodiment of the preamble generator according to the present invention the short pseudo random sequence ($X_{SHORT}$) is:

$$X_{SHORT}=(-1,-1,-1,1,1,-1,-1,1,-1,1,1,1)$$

In the following preferred embodiments of the preamble generator for a multiband orthogonal frequency division multiplexer transceiver are described with reference to the enclosed figures.

BRIEF DESCRIPTION OF THE DRAWINGS

FIG. 1 shows the transmission of analog data transmission burst signals by a wireless network according to the state of the art;

FIG. 2 shows schematically two different wireless local networks each comprising several transceivers which are operated simultaneously according to the state of the art;

FIG. 15 shows cover sequences for the time domain preamble as employed by the preamble generator according to the present invention;

FIG. 16 shows cover sequences for a shortened time domain preamble as employed by the preamble generator according to the present invention;

FIG. 17 shows the data samples of an OFDM symbol in the FFI mode as used in a preferred embodiment of the preamble generator according to the present invention.

DETAILED DESCRIPTION

Figure 3A:
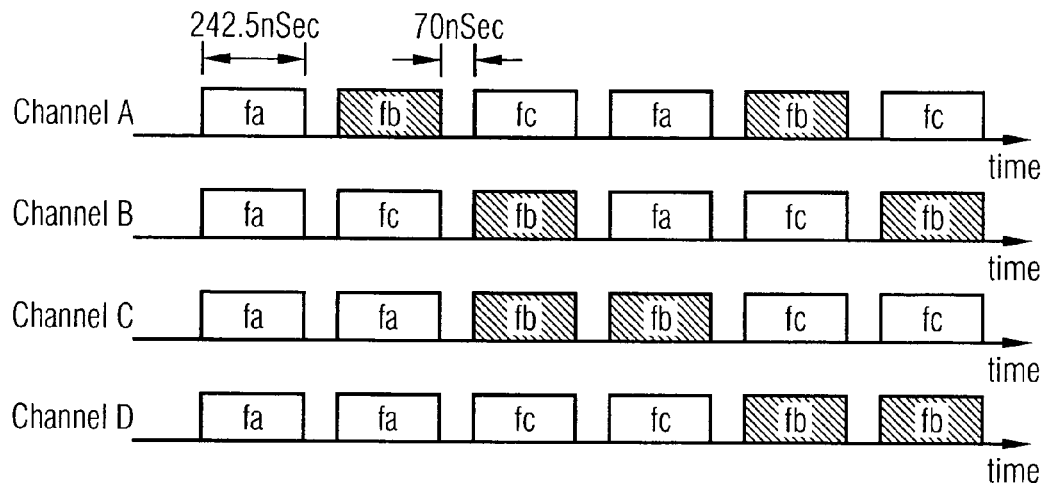
FIGS. 3a, 3b show frequency hopping schemes employed by a wireless local area network according to the state of the art using four different TFI data transmission channels and using three different FFI data transmission channels.
Figure 3B:
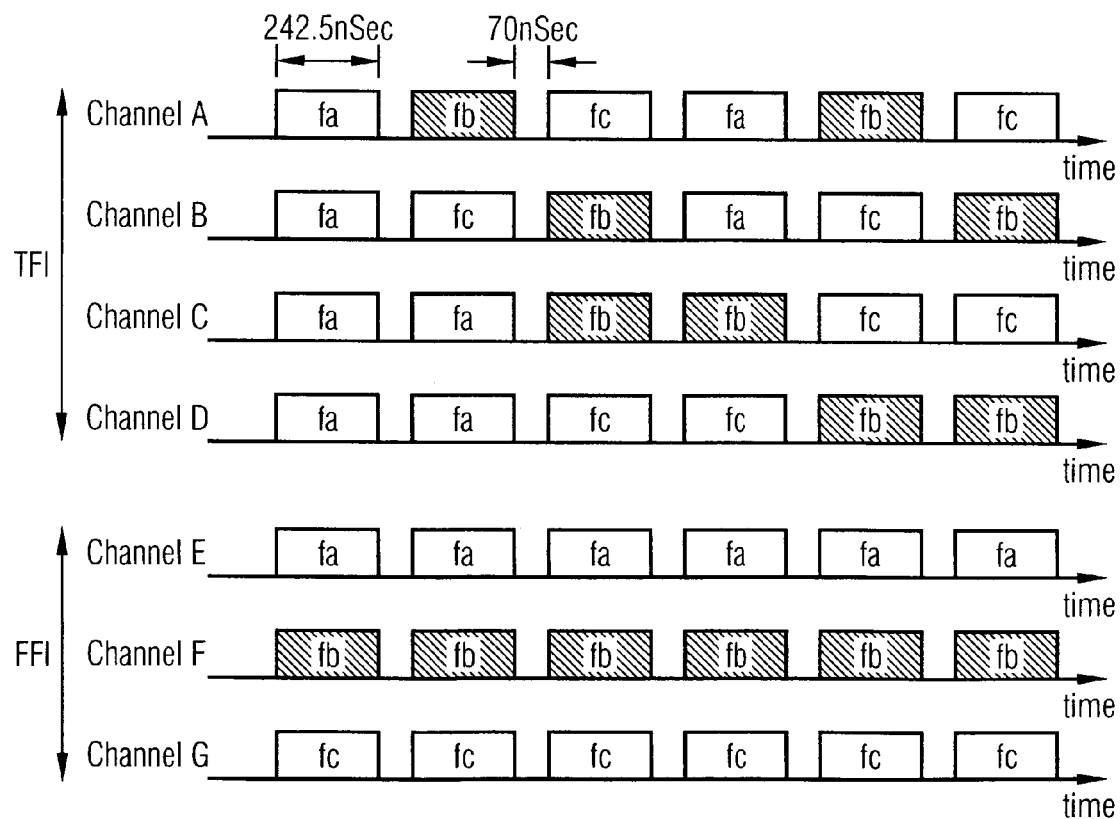
Figure 4:
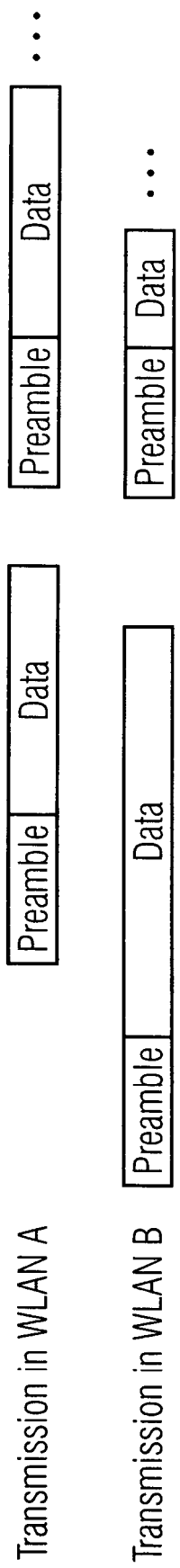
FIG. 4 shows the transmission of analog data transmission burst signals by two wireless local area networks which are operated simultaneously in the same local area.
Figure 5:
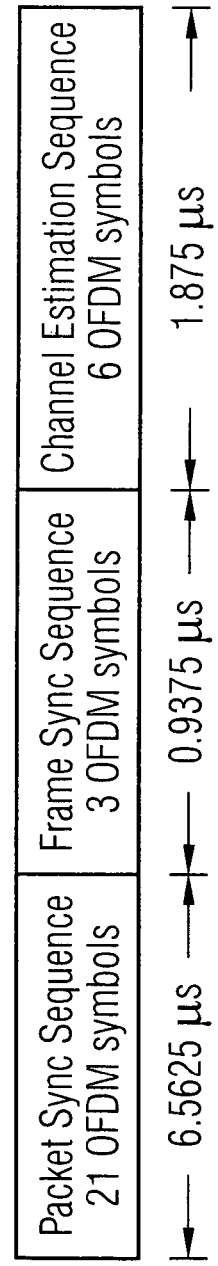
FIG. 5 shows a preamble as employed by a conventional multiband OFDM transceiver according to the state of the art.
Figure 6:
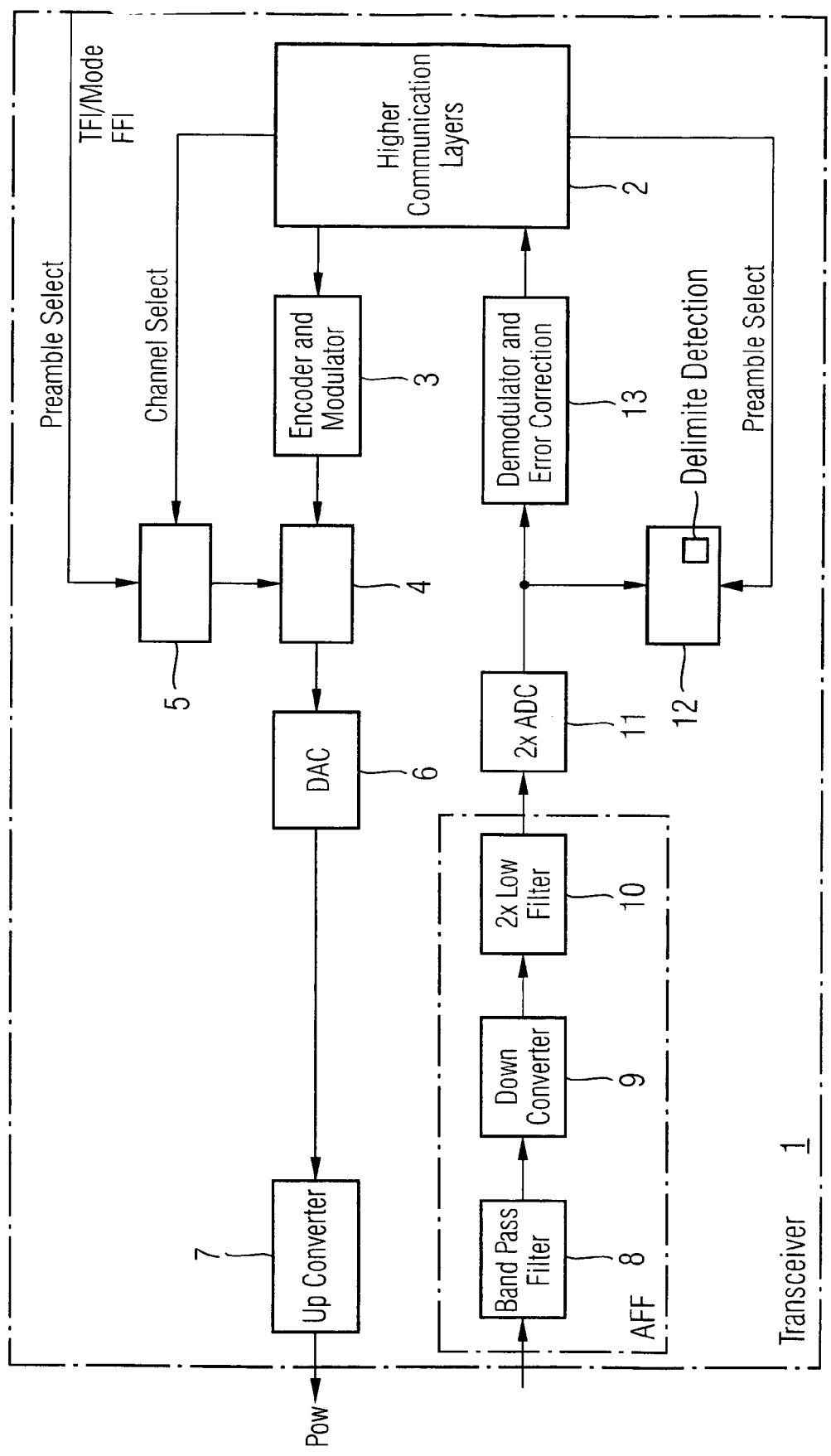
FIG. 6 shows a block diagram of a transceiver comprising the preamble generator according to the present invention.

As can be seen from FIG. 6 the transceiver 1 for a wireless local area network (WLAN) comprising the preamble generator according to the present invention comprises a transmitter and a receiver.

The transmitter converts data information packets from higher communication layers into RF (radio frequency) signals. The receiver of the transceiver extracts packet information from received RF signals.

As can be seen from FIG. 6 the transmitter included in the transceiver 1 according to the present invention comprises the following units. The transmitter comprises an encoder and modulating unit 3 which encodes the data bits received from a higher communication layer control unit 2 by adding redundant bits and modulates the digital data signal thus generating a time domain sampled signal. This time domain sampled signal is in a preferred embodiment a dual signal or complex signal. The complex signal (I+iQ) is supplied by the encoding and modulating unit 3 to a scheduler 4.

The transmitter included in the transceiver 1 further comprises a preamble generator 5 according to the present invention. The preamble generator 5 supplies a preamble data sequence to the scheduler 4 The preamble data sequence is specific for the data transmission channel used by the transceiver 1, i.e. the preamble generated by the preamble generator 5 is unique for a wireless local area network (WLAN) which includes the transceiver 1 as shown in FIG. 6.

The scheduler 4 of the transceiver 1 assembles the data sample sequence supplied by the encoding and modulating unit 3 and the preamble generated by the preamble generator 5 to perform a digital data transmission burst which is output to at least one digital analogue converter 6. The digital analogue converter 6 converts the digital time domain signal received from the scheduler 4 into a continues analogue signal. The output of the digital analogue converter 6 is connected to an up-converter 7. The up-converter 7 converts the base band analogue continues signal generated by the digital analogue converter 6 to an RF-signal by modulating the received signal with a carrier signal to generate an analogue data transmission burst signal. The generated analogue data transmission burst signal is transmitted by the transceiver 1 via an antenna to a receiving transceiver of the same wireless local area network using the same data transmission channel. When frequency hopping is employed (i.e. in the TFI mode) the modulation carrier is periodically changed.

The transceiver 1 further comprises a receiver which includes a band pass filter 8 for filtering the received RF-signal supplied from the antenna of the transceiver 1.

The output of the band pass filter 8 is connected to a down-converter 9. The down-converter 9 demodulates the filtered RF-signal and converts the RF-signal to a complex base band signal. When frequency hopping is employed the demodulation frequency used by the down-converter 9 is periodically changed.

At the output side of the down-converter 9 an analogue low pass filter 10 is provided.

At least one analogue digital converter 11 samples the continues time signal supplied from the low pass filter 10 for producing a discrete time domain signal.

The transceiver 1 further comprises a preamble detector 12 which is provided for detecting the existence of a predefined preamble which is specific for the wireless local area network (WLAN) to which the transceiver 1 belongs. Further the preamble detector 12 extracts parameters for demodulating the received data transmission burst. These parameters are supplied by the preamble detector 12 to a demodulating and error correction unit 13.

The demodulator and error correction unit 13 demodulates the received data section of the data transmission burst using the encoded redundancy to estimate the information content of the received data packet.

As can be seen the transceiver 1 includes the preamble generator 5 according to the present invention and a preamble detector 12 which are controlled by the higher communication layer control unit 2.

Figure 7:
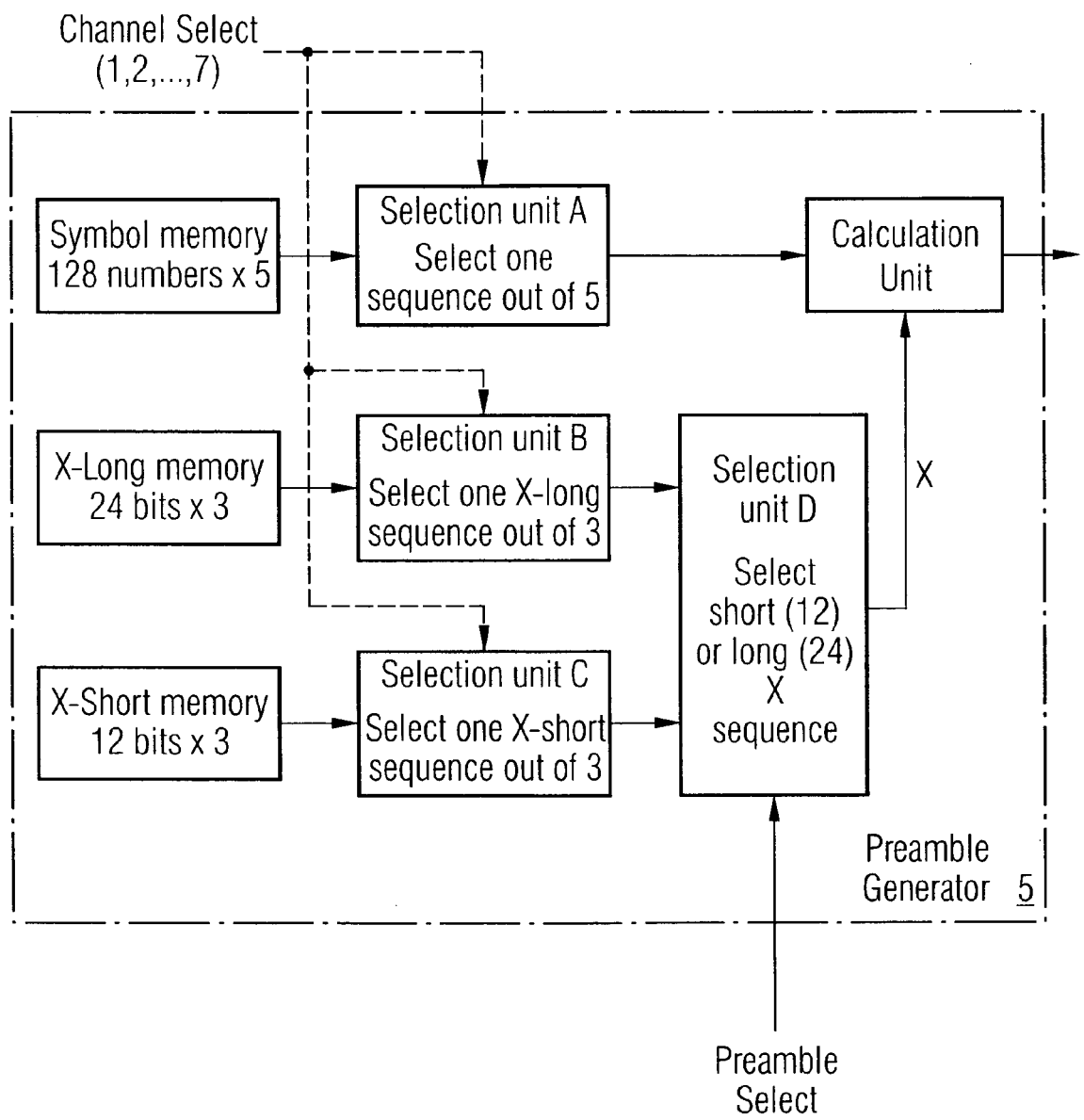
FIG. 7 shows a block diagram of a preferred embodiment of the preamble generator according to the present invention.

FIG. 7 shows a preferred embodiment of the preamble generator 5 according to the present invention. The preamble generator 5 receives a channel select signal from the higher communication layer 2 of the transceiver 1 as shown in figure 6. The channel select signal defines the hopping sequence defined by the TFC code. In a preferred embodiment there are seven channels wherein the first four channels perform a real frequency hopping in a TFI mode and the remaining three channels transmit the data packets in a fixed frequency band without frequency hopping in a FFI mode.

In a symbol memory of the preamble generator are stored five sets of data samples, wherein the first four sets are used for the first four data transmission channels which employ real frequency hopping and the fifth set of data samples is used for all three FFI data channels which use the same set of data samples. FIG. 17 shows a set of 128 data samples stored in the symbol memory and used for the three FFI data transmission channels. A first selection unit A selects in response to the channel select signal one set of data samples stored in the symbol memory and supplies these 128 data samples to a calculation unit provided for multiplying two data vectors.

In a further memory of the preamble generator 5 three long pseudo random sequences ($X_{LONG}$) are stored. The first two data channels use one long pseudo random data sequence ($X_{LONG}1/2$) and channel three and four use a different long pseudo random data sequence ($X_{LONG}3/4$). The FFI-data transmission channels use a third long pseudo random sequence ($X_{LONG}5/6/7$) for scrambling of the preamble. The selection unit B selects one pseudo random sequence stored in the second memory of the preamble generator 5 in response to the channel select signal and forwards it to a fourth selection unit D.

The preamble generator 5 comprises a third memory for storing three short pseudo random sequences ($X_{SHORT}$). The FFI-data transmission channels use the third short pseudo random sequence ($X_{SHORT}5/6/7$) stored in said memory. A selection unit C of the preamble generator 5 selects in response to the channel select signal the relevant short pseudo random sequence stored in the third memory. The data transmission channels 1 and 2 use the first short pseudo random sequence ($X_{SHORT}1/2$) stored in said memory and data transmission channels 3 and 4 use the second short pseudo random sequence ($X_{SHORT}3/4$) stored in said third memory.

In response to a preamble select signal the fourth selection unit D selects whether the long pseudo random sequence ($X_{LONG}$) or the short pseudo random sequence ($X_{SHORT}$) of the data transmission channel is used by the calculation unit of the preamble generator 5. The calculation unit multiplies the data sample vector selected by the selection unit A with the pseudo random sequence forwarded by the selection unit D. The calculation unit multiplies both vectors in a so called Kronecker product:

In a preferred embodiment, the sequences $X_{short}$ for each TFC are identical to the last 12 elements in $X_{long}$. Thus, given the $X_{long}$ for TFCs 5, 6 and 7 of FIG. 15, the $X_{short}$ for TFCs 5, 6 and 7 would reflect the following sequence:

$$X_{short} = (-1, 1, -1, -1, 1, -1, -1, 1, -1, 1, 1, 1)$$

In this embodiment, the third memory for the preamble generator 5 shown in FIG. 7 is not necessary.

The output of the calculation unit is given for two vectors having a length of 128 data samples and a long pseudo random sequence ($X_{LONG}$) comprising 24 bits as following:

$$\text{output} = x(1)*y(1), \ x(2)*y(1), \ \ldots, \ x(128)*y(1), \ \ldots$$
$$x(1)*y(2), \ x(2)*y(2), \ \ldots, \ x(128)*y(2), \ \ldots$$
$$x(1)*y(24), \ x(2)*y(24), \ \ldots, \ x(128)*y(24), \ \ldots$$

FIG. 15 shows the data content of the second memory ($X_{LONG\ MEMORY}$) of the preamble generator 5 shown in FIG. 7

FIG. 16 shows the data content of the third memory ($X_{SHORT\ MEMORY}$) of the preamble generator 5 according to the present invention.

The third column of FIGS. 15, 16 are the pseudo random data sequences used in the FFI mode of the transceiver 1. The last twelve data entries of a long pseudo random data sequence (comprising 24 data entries) are identical to the twelve data entries of the corresponding short pseudo random data sequence ($X_{SHORT}$) as shown in FIG. 16.

Since the short pseudo random data sequence comprising twelve data entries of a data transmission channel is identical to the last twelve data entries of the corresponding long pseudo random data sequence ($X_{LONG}$) it is possible to simplify the transceiver, because the same design for the delimiter detector can be used for both long and short preambles.

The preamble generator 5 according to the present invention as shown in FIG. 7 generates in the fixed frequency interleaving mode (FFI) a preamble of the data packet by multiplying a predetermined preamble with a selected pseudo random data sequence ($X_{LONG}/X_{SHORT}$) to flatten a power spectrum of the preamble.

The pseudo random data sequences (X) or scrambling vectors stored in the memory of the preamble generator 5 enable a robust delimiter detection. As can be seen from FIG. 6 the transceiver 1 comprises a preamble detector 12. The preamble detector 12 includes a delimiter detection unit.

Figure 8:
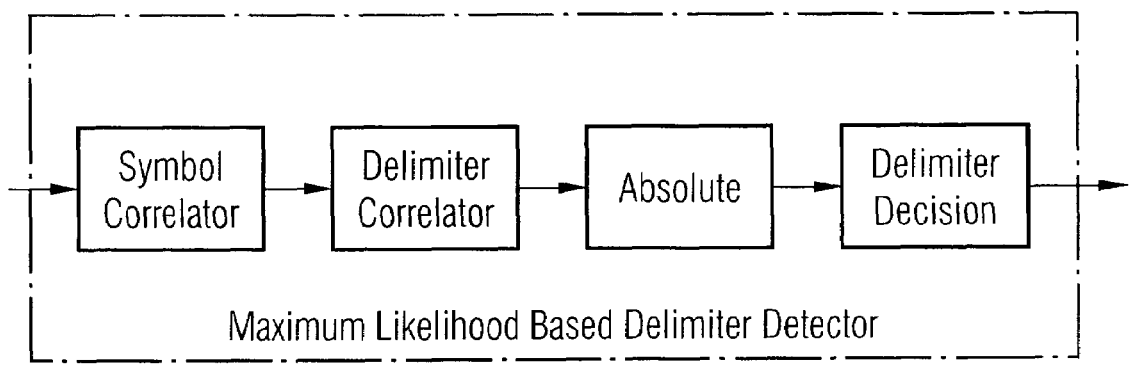
FIG. 8 shows a block diagram of a delimiter detector within the preamble detector of the transceiver as shown in FIG. 6.

FIG. 8 shows a first embodiment of a delimiter detector used in the preamble detector 12 of the transceiver 1. FIG. 8 shows a so called maximum likelihood delimiter detector. The received signal from the antenna is processed at an analog front-end of the transceiver 1 which amplifies the signal, filters the desired frequency band and down converts the desired frequency band to base band. The analog front-end output signal is sampled at the analog digital converter 11. Two analog digital converters are used to sample the base band I/Q signal.

At the time when the delimiter detector as shown in FIG. 8 is activated the preamble is already detected and an automatic gain control (AGC) is already tuned. The I/Q converted output signal of the analog digital converter 11 is a complex signal that is correlated with a 128-length preamble symbol. For the specific definition of the preambles symbol as shown in FIG. 17 the correlation is effectively done with a reduced complexity so that there is no need for a 128-length correlator. The output of the symbol correlator is generated ever 312.5 nSec and used by a delimiter correlator to correlate with the K-delimiter binary samples, i.e. the last K-elements in the pseudo random data sequence X.

$$Out(t) = \sum_{k=1}^{k} input(t - K + k) \cdot X_{N-K+k} \quad (2)$$

A further circuit generates the absolute value of the output signal of the delimiter correlator. A higher value generated by the circuit indicates a high delimiter likelihood. A small value indicates a small delimiter likelihood. The absolute value is compared by a comparator with a adjustable threshold value for making a delimiter decision and to identify the preamble.

FIG. 8 shows a specific embodiment of a maximum likelihood based delimited sector. There are other possible embodiments of a maximum likelihood delimiter detector. The common feature of all such delimiter detectors is that the performance of the detector system is dominated by the features of the following correlation:

For a given sequence X, when $Z=(z_1, z_2, \ldots, z_k)=(X_{N-K+1}, X_{N-K}, \ldots x^N)$ is the delimiter of X, which is a sequence of the last K elements of X.

R(n) is given by the following absolute cross correlation function:

$$R(n) = \left| \sum_{k=1}^{K} x_{n-k} \cdot z_k \right| \text{ for } n = 0, 1, \ldots N - K \quad (3)$$

The maximum of R(n) is obtained at n=N−K, and the maximum is R(N−K)=K. A good selection of X is that R(n) for n=0,1, . . . N−K−1, gets small values compared to the maximal value R(N−K)=K This criterion improves the performance of maximum-likelihood based delimiter detection.

For $X_{LONG}$ that is specified above, and for K=6, the correlation is upper bounded R(n)≦2 for all n=0,1, . . . , N−7, compared to the peak (R(N−6)=6). This applies also for $X_{SHORT}$ that is specified above, and for K=6, R(n) ≦2 for n=0, 1, . . . , N−7 compared to the peak (R(N−6)=6). A difference of at least 4 between the peak R(N−K) and any preceding value of R(n) gives robustness to the maximum likelihood based delimiter detection under noisy environment.

Figure 9:
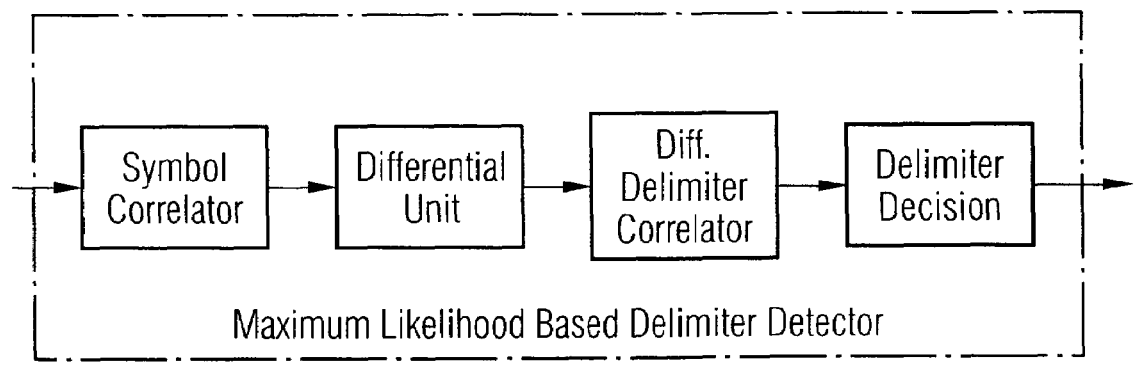
FIG. 9 shows an alternative embodiment of a delimiter detector within the preamble detector of the transceiver as shown in FIG. 6.

FIG. 9 shows an alternative embodiment of a delimiter detector within the preamble detector 12. The output of the symbol correlator is supplied every 312.5 nSec to a differential unit to compute a differential value. In a preferred embodiment the complex correlator output is multiplied by the conjugate of the previous correlator output.

$$Out(t)=Input(t)*conjugate(input(t-1)) \quad (4)$$

The "t" is a time index using 312.5 nSec as unit.

When $\overline{Z}=(\overline{z}_1, \overline{z}_2, \ldots, \overline{z}_{K-1})=(z_2 z_1, z_3 z_2, \ldots, z_K z_{K-1})$ is the differential delimiter of X the delimiter correlation correlates the real of its input sequence with $\overline{Z}$ $$Out(t) = \sum_{k=1}^{K-1} real(input(t - K + k)) \cdot \hat{z}_k \quad (5)$$

The delimiter correlator output is compared to a threshold for making a delimiter decision.

The above scheme presents a specific realization of a differential delimiter detector. There are other variants of a possible detector. The common feature for all these detectors is that the performance of the detector is dominated by the features of the following differential correlation.

For a given the sequence $\overline{X}=(\overline{x}_1, \overline{x}_2, \ldots, \overline{x}_{N-1})=(x_2, x_1, x_3 x_2, \ldots, x_N x_{N-1})$ is the differential version of X, which is a length N−1 sequence where each element is a multiplication of two adjacent elements in X. Similarly $\overline{Z}=(\overline{z}_1, \overline{z}_2, \ldots, \overline{z}_{X-1})=(z_2 x_1, z_3, z_2, \ldots, z_K z_{K-1})$ is the differential delimiter of X, which is a sequence of the last K−1 elements of $\overline{X}$.

A differential correlation $D_{(n)}$ is given by the following cross correlation function:

$$D(n) = \sum_{k=1}^{K-1} \hat{x}_{n+k} \cdot \hat{z}_k \text{ for } n = 0, 1, \ldots N - K \quad (6)$$

The maximum of D(n) is obtained at n=N−K, and the maximum is D(N−K)=K−1. A good selection of X is that D(n) for n=0,1, . . . N−K−1, gets small values compared to the maximal value D(N−K)=K−1. This criterion improves the performance of differential delimiter detector.

For the $X_{LONG}$ that is specified above, and for K=6, the differential correlation is upper bounded D(n)≦1 for n=0, 1, . . . , N−7, compared to the peak (D(N−6)=5) for $X_{SHORT}$ that is specified above, and for K=6, D(n)≦2 for n=0,1, . . . , N−7, compared to the peak (D(N−6)=5) this difference of at least 4 between the peak D(N−K) and any preceding value of D(n) gives robustness to the differential likelihood delimiter detection under noisy environment. Although this protection is smaller than for the maximum likelihood case, still the differential delimiter detector has some other benefits over the maximum likelihood approach since there is no need for carrier offset compensation.

Figure 10:
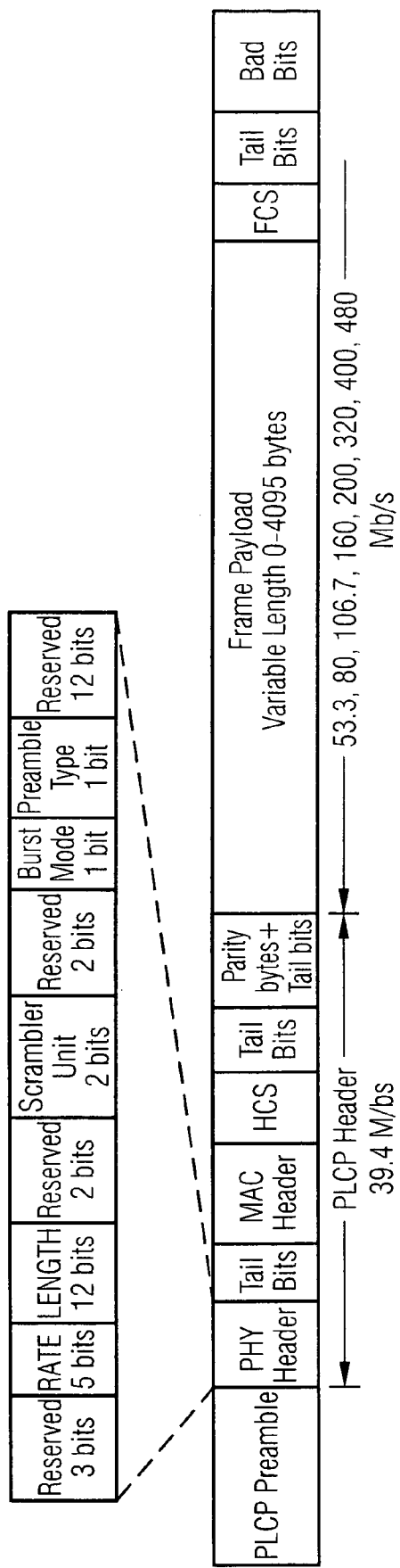
FIG. 10 shows the format of a PLCP frame having a preamble according to the present invention.

FIG. 10 shows the data format of the frame including a preamble according to the present invention. The preamble precedes a PLCP header and a payload data section. The desired information data rate there is between 53.3 and 480 MB/sec. The PLCP preamble sequence is associated with a particular time frequency code (TFC). The preamble signal is a real signal at the baseband but for modes with data rates higher than approximately 100 mbps the transmitted signal is complex at the baseband. The PLCP preamble is inserted into the real part of the complex baseband signal.

Figure 11:
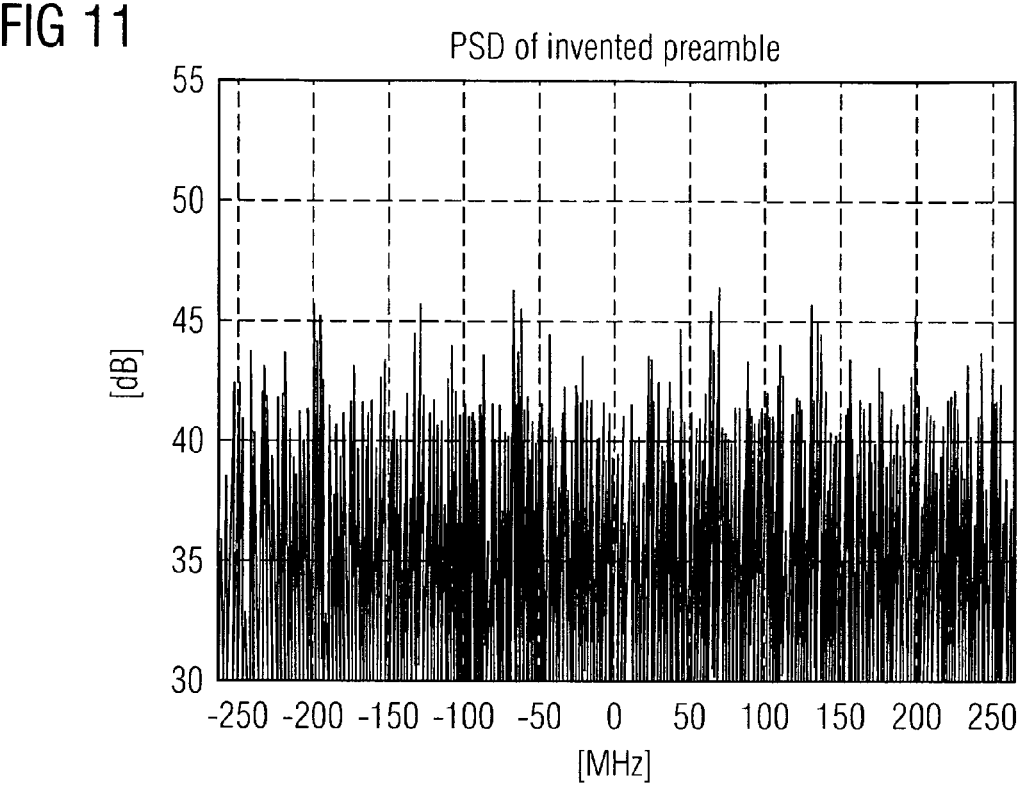
FIG. 11 shows the base-band power spectrum density (PSD) of a preamble generated by the preamble generator according to the present invention.

FIG. 11 shows the base-band power spectral density (PSD) of the preamble generator generated by the preamble generator according to the present invention for the entire frequency band of approximately 500 MHz.

Figure 12:
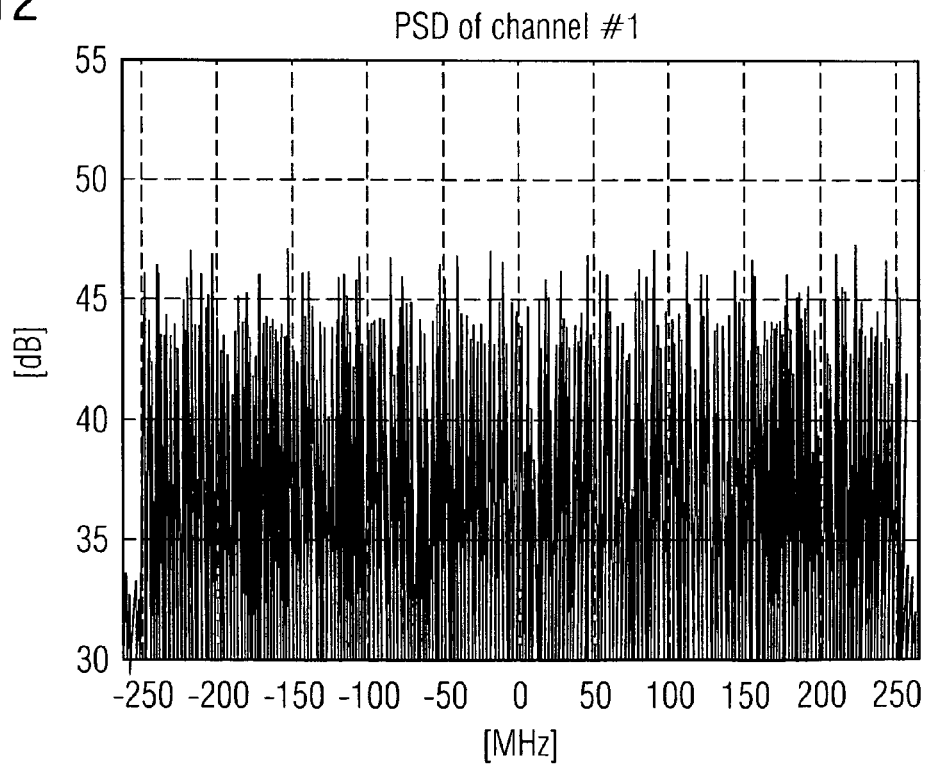
FIG. 12 shows the base-band power spectrum density (PSD) of a data transmission channel.

FIG. 12 shows the base-band power spectrum density of the data transmission channel 1.

Figure 13:
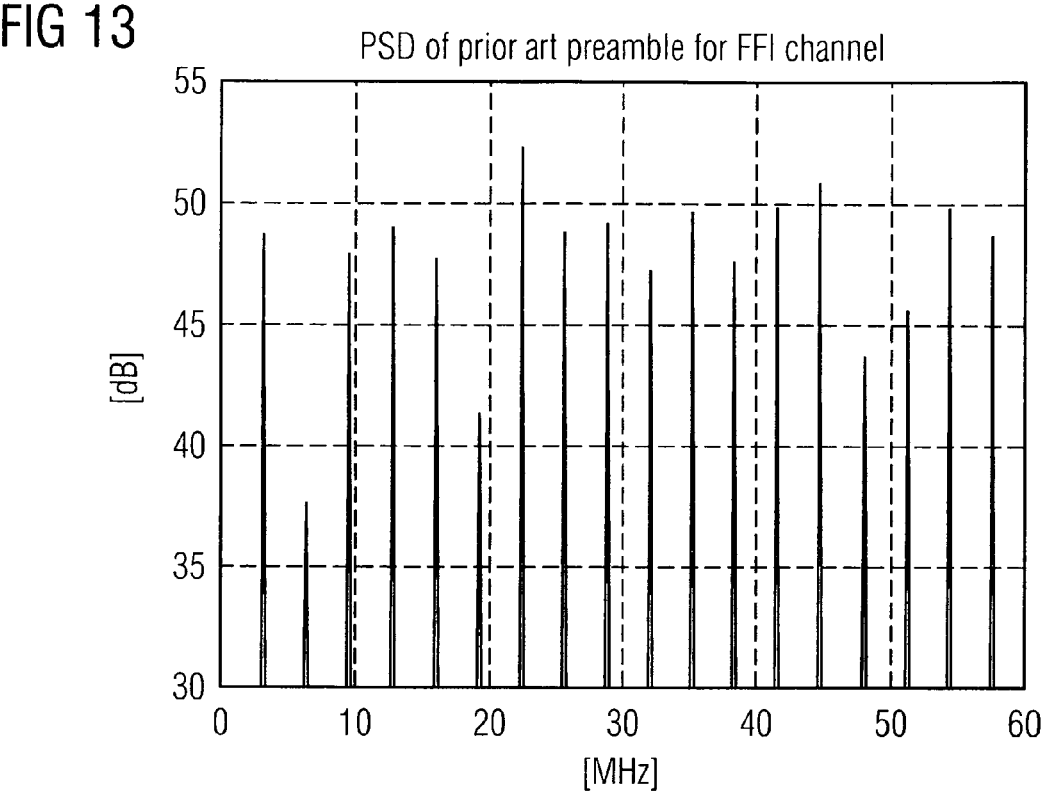
FIG. 13 shows the base-band power spectrum density (PSD) of a prior art preamble for a FFI channel for a part of the frequency band.

FIG. 13 shows the base-band power spectrum density of a preamble FFI data transmission channel, i.e. data transmission channels 5 to 7 generated by a prior art preamble generator between 0 and 60 MHz.

Figure 14:
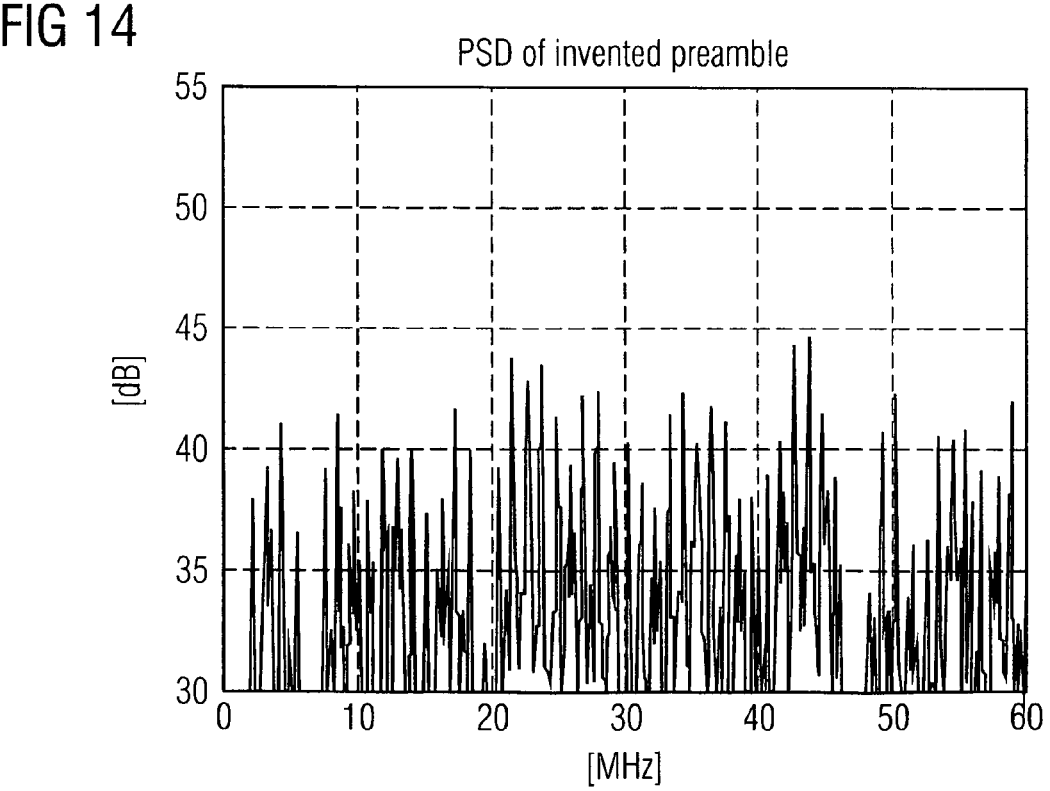
FIG. 14 shows the base-band power spectrum density (PSD) of a preamble generated by the preamble generator according to the present invention.

FIG. 14 shows the base-band power spectrum density (PSD) generated by the preamble generator 5 according to the present invention in the same frequency band. When comparing FIG. 13 and FIG. 14 it becomes evident that the spectral peaks caused by the preamble generated by the preamble generator 5 according to the present invention are significantly smaller than the peaks generated by the prior art preamble generator. The power spectrum of the preamble generated by the preamble generator 5 according to the present invention is flattened and enables higher transmitted power in the fixed frequency interleaving mode (FFI) of the transceiver.

The multiband OFDM transceiver 1 has a special FFI mode and uses a pseudo random sequence of length N for scrambling the preamble. By a selection of a specific pseudo random sequence X the preamble power spectrum is flattened for improving the performance under a resolution bandwidth specification that is smaller than the OFDM symbol rate. Specific pseudo random sequences are used by the preamble generator 5 and improve the delimiter detection performance of the transceiver 1.

The invention claimed is:

1. A multiband frequency division multiplexing transceiver switchable between a time frequency interleaving mode and a fixed frequency interleaving mode, said multiband frequency division multiplexing transceiver comprising:

a preamble generator operable to generate a scrambled preamble by multiplying a predetermined preamble of a data packet to be transmitted in fixed frequency interleaving mode with a pseudo random data sequence, such that when the preamble is transmitted in fixed frequency interleaving mode, the power spectrum of the transmitted scrambled preamble is flattened with respect to the power spectrum realized when transmitting the predetermined preamble without scrambling, wherein the preamble generator comprises a first memory operable to store at least one predetermined preamble, a second memory operable to store at least one long pseudo random data sequence, a third memory operable to store at least one short pseudo random data sequence.

a first selection unit operably connected to the first memory to select one of the stored at least one predetermined preamble in response to a channel selection signal, a second selection unit operably connected to the second memory to select one of the stored at least one long pseudo random data sequence in response to the channel selection signal, a third selection unit operably connected to the third memory to select one of the stored at least one short pseudo random data sequence in response to the channel selection signal, and a fourth selection unit operably connected to the second selection unit and the third selection unit to select one of the selected one of the stored at least one long pseudo random data sequence and the selected one of the stored at least one short pseudo random data sequence in response to a preamble selection signal.

2. The transceiver of claim 1, wherein the preamble generator is operable to generate the scrambled preamble by multiplying the predetermined preamble with a binary pseudo random data sequence.

3. The transceiver of claim 2, wherein:
the preamble generator is operable to generate the scrambled preamble by multiplying a predetermined preamble comprising a predetermined number of orthogonal frequency division multiplexed symbols with the binary pseudo random data sequence;
the binary pseudo random data sequence comprises a predetermined number of binary data values; and
the number of predetermined orthogonal frequency division multiplexed symbols corresponds to the number of predetermined binary data values.

4. The transceiver of claim 3, wherein the stored at least one long pseudo random data sequence comprises the following sequence: −1, −1, −1, −1, −1, −1, −1, 1, −1, −1, 1, −1, −1, 1, −1, −1, 1, −1, −1, 1, −1, 1, 1, 1.

5. The transceiver of claim 3, wherein the stored at least one long pseudo random data sequence comprises first predetermined sequence of twenty-four data.

6. The transceiver of claim 1, wherein the preamble generator is operable to generate a scrambled preamble by multiplying a predetermined preamble comprising a predetermined number of orthogonal frequency division multiplexed symbols with a pseudo random data sequence.

7. The transceiver of claim 6, wherein each of the predetermined number of orthogonal frequency division multiplexed symbols comprises a sequence of data samples.

8. The transceiver of claim 7, wherein each of the predetermined number of orthogonal frequency division multiplexed symbols comprises 128 data samples.

9. The transceiver of claim 1, wherein the preamble generator is operable to generate a scrambled preamble by multiplying the at least one stored preamble with the selected one of the stored at least one long pseudo random data sequence and the stored at least one short pseudo random data sequence in a Kronecker product.

10. The transceiver of claim 1, wherein the stored at least one long pseudo random data sequence comprises the following sequence: −1, −1, −1, −1, −1, −1, −1, 1, −1, −1, 1, −1, −1, 1, −1, −1, 1, −1, −1, 1, −1, 1, 1, 1.

11. The transceiver of claim 1, wherein the stored at least one long pseudo random data sequence comprises first predetermined sequence of twenty-four data.

12. A multiband frequency division multiplexing transceiver switchable between a time frequency interleaving mode and a fixed frequency interleaving mode, said multiband frequency division multiplexing transceiver comprising:

a preamble generator operable to generate a scrambled preamble by multiplying a predetermined preamble of a data packet to be transmitted in fixed frequency interleaving mode with a pseudo random data sequence, such that when the preamble is transmitted in fixed frequency interleaving mode, the power spectrum of the transmitted scrambled preamble is flattened with respect to the power spectrum realized when transmitting the predetermined preamble without scrambling, the preamble generator comprising a first memory operable to store at least one predetermined preamble, a second memory operable to store at least one long pseudo random data sequence, and a calculation unit operable to generate a scrambled preamble by multiplying the stored at least one predetermined preamble with a selected one of the stored at least one long pseudo random data sequence and a subset of the stored at least one long pseudo random data sequence; and wherein the stored at least one long pseudo random data sequence comprises a first predetermined sequence of twenty-four data; and the subset of the stored at least one long pseudo random data sequence consists of the last twelve data of the first predetermined sequence of twenty-four data.

13. The transceiver of claim 12, wherein the stored at least one long pseudo random data sequence comprises the following sequence: −1, −1, −1, −1, −1, −1, −1, 1, −1, −1, 1, −1, −1, 1, −1, −1, 1, −1, −1, 1, −1, 1, 1, 1.

14. The transceiver of claim 12 wherein the subset of the stored at least one long pseudo random data sequence comprises the following sequence: −1, 1, −1, −1, 1, −1, −1, 1, −1, 1, 1, 1.

15. The transceiver of claim 14, wherein the calculation unit is operable to generate a scrambled preamble by multiplying the at least one stored preamble with the selected one of the stored at least one long pseudo random data sequence and the subset of the stored at least one long pseudo random data sequence in a Kronecker product.

16. The transceiver of claim 12, wherein the calculation unit is operable to generate a scrambled preamble by multiplying the at least one stored preamble with the selected one of the stored at least one long pseudo random data sequence and the subset of the stored at least one long pseudo random data sequence in a Kronecker product.

* * * * *